United States Patent
Zhu et al.

(10) Patent No.: US 11,009,620 B2
(45) Date of Patent: May 18, 2021

(54) METHOD FOR DETERMINING FAVORABLE TIME WINDOW OF INFILL WELL IN UNCONVENTIONAL OIL AND GAS RESERVOIR

(71) Applicant: Chengdu University of Technology, Chengdu (CN)

(72) Inventors: Haiyan Zhu, Chengdu (CN); Yapu Zhao, Chengdu (CN); Jianchun Guo, Chengdu (CN); Xuanhe Tang, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 0 days.

(21) Appl. No.: 16/790,801

(22) Filed: Feb. 14, 2020

(65) Prior Publication Data
US 2021/0003731 A1 Jan. 7, 2021

(30) Foreign Application Priority Data

Jul. 4, 2019 (CN) .......................... 201910599735.3
Jul. 4, 2019 (CN) .......................... 201910600710.0

(51) Int. Cl.
*G01V 1/50* (2006.01)
*G01V 1/28* (2006.01)
(Continued)

(52) U.S. Cl.
CPC .............. *G01V 1/50* (2013.01); *G01V 1/282* (2013.01); *G06F 30/23* (2020.01);
(Continued)

(58) Field of Classification Search
CPC .... G01V 1/50; G01V 1/282; G01V 2210/646; G01V 2210/6169; G01V 2210/663;
(Continued)

(56) References Cited

U.S. PATENT DOCUMENTS

| 6,389,361 B1 * | 5/2002 | Geiser | G01V 1/008 |
| | | | 702/13 |
| 2005/0171698 A1 * | 8/2005 | Sung | E21B 49/00 |
| | | | 702/9 |

(Continued)

*Primary Examiner* — Mischita L Henson
(74) *Attorney, Agent, or Firm* — Bayramoglu Law Offices LLC

(57) ABSTRACT

A method for determining a favorable time window of an infill well of an unconventional oil and gas reservoir, which comprises the following steps: S1, establishing a three-dimensional geological model with physical properties and geomechanical parameters; S2, establishing a natural fracture network model in combination with indoor core-logging-seismic monitoring; S3, calculating complex fractures in hydraulic fracturing of parent wells; S4, establishing an unconventional oil and gas reservoir model and calculating a current pore pressure field; S5, establishing a dynamic geomechanical model and calculating a dynamic geostress field; S6, calculating complex fractures in horizontal fractures of the infill well in different production times of the parent wells based on pre-stage complex fractures and the current geostress field; S7, analyzing a microseismic event barrier region and its dynamic changes in infill well fracturing; and S8, analyzing the productivity in different infill times, and determining an infill time window.

3 Claims, 8 Drawing Sheets

(51) Int. Cl.
 *G06F 30/23* (2020.01)
 *G06F 111/10* (2020.01)
(52) U.S. Cl.
 CPC ............... *G01V 2210/6169* (2013.01); *G01V 2210/646* (2013.01); *G06F 2111/10* (2020.01)
(58) Field of Classification Search
 CPC ... G01V 2210/6246; G01V 2210/6244; G01V 2210/6122; G01V 2210/6161; G01V 2210/6248; G01V 1/288; G01V 2210/1234; G01V 2210/1299; G01V 2210/1429; G01V 99/005; G01V 1/302; G06F 30/23; G06F 2111/10
 See application file for complete search history.

(56) References Cited

U.S. PATENT DOCUMENTS

| | | | |
|---|---|---|---|
| 2006/0047431 A1* | 3/2006 | Geiser | G01V 1/306 702/12 |
| 2011/0060572 A1* | 3/2011 | Brown | E21B 43/00 703/10 |
| 2016/0061020 A1* | 3/2016 | Sayarpour | E21B 41/00 166/250.01 |

* cited by examiner

Initial　　　　　　　　　　After production

METHOD FOR DETERMINING FAVORABLE TIME WINDOW OF INFILL WELL IN UNCONVENTIONAL OIL AND GAS RESERVOIR

CROSS REFERENCES TO THE RELATED APPLICATIONS

This application is based upon and claims priority to Chinese Patent Application No. 201910600710.0, filed on Jul. 4, 2019, and 201910599735.3, filed on Jul. 4, 2019, the entire contents of which are incorporated herein by reference.

TECHNICAL FIELD

The present invention relates to the fields of development, production increase and transformation of oil and gas resources, in particular to a method for determining a favorable time window of an infill well in an unconventional oil and gas reservoir.

BACKGROUND

A favorable time window of an infill well is proposed based on the infill time. The infill time generally refers to the time from when parent wells are put into production, until a certain time to implement infill well drilling, reservoir reconstruction and putting into production (in case of a long time scale of the entire oil and gas reservoir production, the infill well drilling, reservoir reconstruction and production testing can be considered as a time node), and this time is the infill time. On this basis, the favorable time window of infill wells generally refers to: a time calculated from the time when the parent wells is officially put into production, where if the infill well drilling and reservoir fracturing reconstruction are implemented before a certain time point, the reservoir reconstruction effect and the reconstructed production capacity of the infill well will not be affected by the production of the parent wells; and if the infill well fracturing is implemented after this time point, the geomechanical characteristics of the reservoir near the infill well will change to some extent due to the production of the parent wells, which will significantly reduce the reservoir reconstruction effect and productivity of the infill well. The core indicator used to evaluate whether the reservoir reconstruction effect is affected by the production of the parent wells is the "barrier effect" of microseismic events in the reservoir fracturing reconstruction of infill wells. The "barrier effect" of the microseismic events is defined in such a manner: the distribution of microseismic events near the well circumference of an infill well is similar to that of parent wells, however, near the parent wells, the magnitude and number of microseismic events will decrease significantly, and even be undetectable, and this phenomenon is called the "barrier effect" of microseismic events. Corresponding to the "barrier effect" of microseismic events, the area near the parent wells is called the "microseismic event barrier region".

With the continuous exploitation of shale gas resources, many unconventional oil and gas reservoirs in China are gradually entering the middle stage of development. In the middle-stage development adjustment plan, it is necessary to drill an infill horizontal well in the current exploitation area and implement large-displacement volume fracturing to supplement block production capacity, fully develop unused areas, and improve the recovery rate. The unconventional oil and gas reservoirs that have entered the middle stage of development have gradually started to implement volume fracturing of an infill test well. Through microseismic monitoring of the infill test well fracturing construction process, it is found that: the occurrence of microseismic events near the well circumference of the infill well is similar to that in fracturing of the parent wells, that is, a large number of microseismic events of different magnitudes occur, which indicates that complex fractures have occurred in this area; however, in case of the further away from the infill well and the closer to the parent wells, the magnitude and number of microseismic events will decrease significantly, and even be undetectable, which indicates that no complex fractures are formed in an area far from the infill well and close to the parent wells. This is also a very different phenomenon detected during fracturing of the parent wells. It seems that there is a barrier blocking the microseismic events outside the area near the parent wells. Therefore, this phenomenon is called the "barrier effect" of microseismic events, and the area close to the parent wells is called the "microseismic event barrier region". Due to the formation of the barrier effect of the microseismic events, the fracturing reconstruction effect of the infill well (mainly based on the number of fractures and the complexity of the fracture network) is inferior to that is the original production well. Because the extent to which shale gas seeps underground to reach the commercial exploitation level depends mainly on the complex fractures formed by volume fracturing, the "barrier effect" of microseismic events has greatly limited the single-well productivity of the infill well. In order to determine the favorable time for infill well fracturing and provide a reliable basis for the design of volume fracturing construction parameters, it is necessary to evaluate the microseismic event barrier region and its dynamic changes, and determine the favorable time window for the infill well in this area through productivity calculation.

By comparing the monitoring results of microseismic events during parent wells fracturing with the monitoring results of microseismic events during infill well fracturing, it can be found that: the shale reservoir structure is gentle and less heterogeneous, and the parent wells and the infill well are located in the same area. The difference between fracturing formation conditions in the infill well and the parent wells should mainly depend on the changes in reservoir geomechanical characteristics (especially pore pressure and geostress) caused by long-term exploitation of the parent wells. Therefore, it is necessary to analyze the dynamic changes of the geomechanical characteristics before infilling, and analyze and calculate the morphology of fractures in infill well fracturing in different production times (infill time) of the parent wells, reveal the causes of the barrier effect of microseismic events, and evaluate the dynamic changes in the microseismic event barrier region. In addition, based on the simulation of infill well fracturing, it is also necessary to perform productivity evaluation of the infill well and its area by using numerical reservoir simulation, calculate the productivity after infill well fracturing performed in different production times (infill times) of the parent wells, determine a favorable time window of the infill well by comparison, and finally form a complete set of favorable time window determination methods for the infill well.

SUMMARY

An object of the present invention is to overcome the defects of the prior art and provide a method which is capable of simulating and analyzing the changes in geomechanical parameter fields of an unconventional oil and gas reservoir in different production periods of parent wells, comparing and evaluating the corresponding reservoir fracturing transformation effects and post-fracturing productivity of an infill well, and finally determining a favorable time window of the infill well.

The object of the present invention is implemented by the following technical solution: a method for determining a favorable time window of an infill well of an unconventional oil and gas reservoir comprises the following steps:

S1, establishing a three-dimensional geological model with physical and geomechanical parameters, wherein horizon information in the three-dimensional geological model should match a real horizon of a real formation, the physical parameters should include at least porosity, permeability, saturation and sedimentary facies, and the geomechanical parameters should include at least Young's modulus, Poisson's ratio, lithology, lithofacies and three-way geostress;

S2, identifying microscopic natural fracture parameters by rock core analysis, obtaining three-dimensional configuration and distribution of fractures around a well through the analysis of imaging log data, obtaining the distribution of natural fractures in the reservoir through analysis of seismic interpretation results, and establishing a natural fracture network model finally through integration of rock core-logging-seismic data;

S3, embedding the natural fracture network model into the three-dimensional geological model, and calculating complex fractures in hydraulic fracturing in parent wells based on hydraulic fracturing design and construction data;

S4, embedding the complex fractures in hydraulic fracturing of the parent wells into a geological model with natural fractures, establishing a three-dimensional unconventional oil and gas reservoir model according to the three-dimensional geological model, and analyzing and calculating the changes in pore pressure field of the reservoir in different periods;

S5, establishing a four-dimensional dynamic geostress model with reservoir physical properties and rock mechanical properties by using the three-dimensional geological model, and analyzing and calculating the dynamic evolution of reservoir geostress according to the change results of pore pressure field;

S6, combining geostress results in different exploitation times (i.e., infill times) of the parent wells with the complex fracture network geological model, and calculating complex fractures in volume fracturing of the infill well in different exploitation times (i.e., infill times) of the parent wells on the basis of the complex fracture network geological model with updated geomechanical parameters and in combination with the volume fracturing design and construction data of the infill well;

S7, comparing a horizontal stress difference between different production times (infill times) of the parent wells with the complex fracture distribution of the infill well to determine the microseismic event barrier region and its dynamic change process; and S8, determining effectively reconstructed fractures after hydraulic fracturing simulation of the infill well in S6 with the microseismic event barrier region in S7 as a boundary, embedding the effectively reconstructed fractures into the oil and gas reservoir numerical simulation model in S4, calculating the prediction results of single-well and regional productivity after infill well reconstruction in different times, comparing the long-term and short-term cumulative production and recovery conditions of the infill well, and preferably selecting an infill time window of the unconventional oil and gas reservoir.

The present invention has the following advantages:

(1) the unconventional reservoir model with a complex fracture network is established by reservoir natural fracture description and pre-fracturing complex fracture analysis, and the problem that only a simple fracturing fracture can be described in the traditional unconventional oil and gas reservoir model, such that the dynamic change in pore pressure in the production process cannot be analyzed accurately is solved;

(2) by considering the dynamic production parameters, a four-dimensional dynamic geostress model of the shale reservoir is established to overcome the problem that the three-dimensional static geostress model cannot reflect the dynamic change in the geostress field during the long-term exploitation of the shale reservoir;

(3) the natural fracture state, the early hydraulic fracturing fracture state as well as the heterogeneity and anisotropy of pore elastic parameters of the shale reservoir can be described accurately, and the true state of the shale reservoir before fracturing of the infill well is reflected to a greater extent;

(4) the problem that the morphology of the complex fractures in infill well fracturing is solved by means of volume fracturing analysis of the infill well developed on the basis of four-dimensional geostress results; and (5) the present invention provides a method for determining a favorable time window of the unconventional oil and gas reservoir, which provides a reliable basis for favorable infill time determination of the infill well and fracturing construction of the infill well of the unconventional oil and gas reservoir, thereby being beneficial to the maximization of the productivity of the reconstructed area of the infill well.

DETAILED DESCRIPTION OF THE EMBODIMENTS

Figure 1:
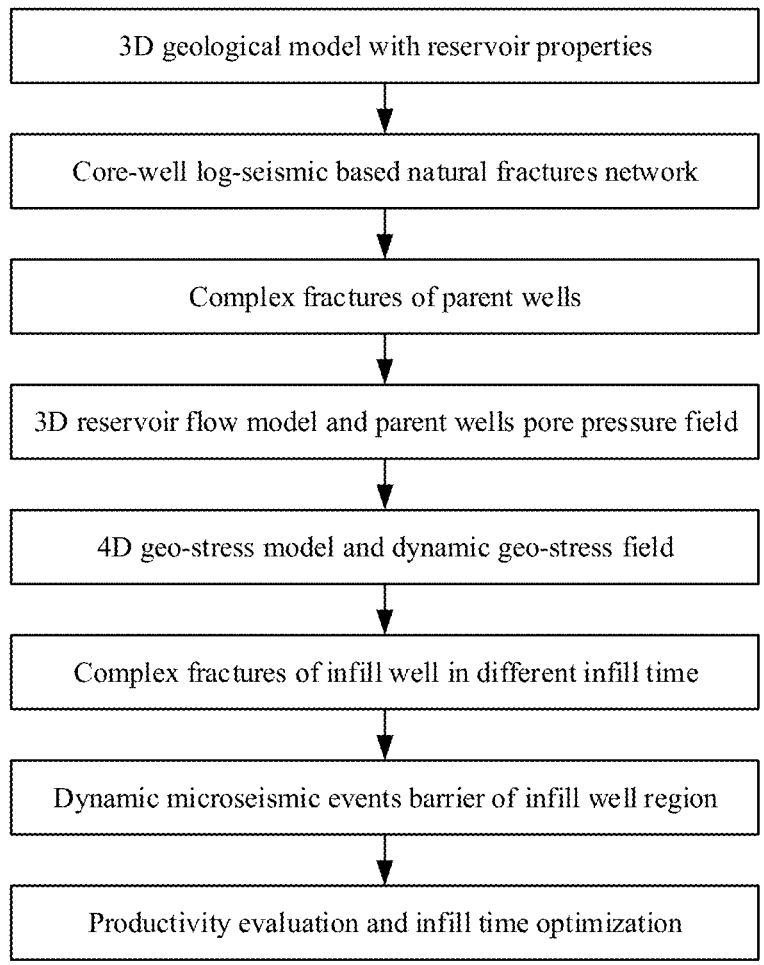
FIG. 1 is a flowchart of the present invention.

The present invention will be further described below with reference to the accompanying drawings, but the scope of the present invention is not limited to the followings.

A method for determining a favorable time window of an infill well of an unconventional oil and gas reservoir comprises the following steps:

S1, establishing a three-dimensional geological model with physical and geomechanical parameters, wherein horizon information in the three-dimensional geological model should match a real horizon of a real formation, the physical parameters should include at least porosity, permeability, saturation and sedimentary facies, and the geomechanical parameters should include at least Young's modulus, Poisson's ratio, lithology, lithofacies and three-way geostress.

The specific step of establishing the three-dimensional geological mode includes: firstly, establishing a three-dimensional geological layer model of each small layer in the reservoir according to seismic data or geological atlas, and correcting the layer information by using single-well data in a block; then, dividing planar grids according to the calculation accuracy requirement, and dividing the grids with a small layer thickness in the longitudinal direction; next, performing interpretation on the reservoir layer in combination with a single-well parameter profile (including at least porosity, permeability, saturation, sedimentary facies, density, Young's modulus, Poisson's ratio, lithology, lithofacies and three directions) corrected in an indoor rock core experiment; finally, performing three-dimensional interpolation on physical and geomechanical attribute parameters to generate a three-dimensional geological model; constraining the physical parameters such as porosity, permeability and saturation, and rock mechanical parameters such as Young's modulus and Poisson's ratio by using the sedimentary facies and lithofacies; performing interpolation by using a Gaussian random function model; and performing interpolation on three-way principal stress parameters by using a Kriging linear interpolation method.

Figure 2:
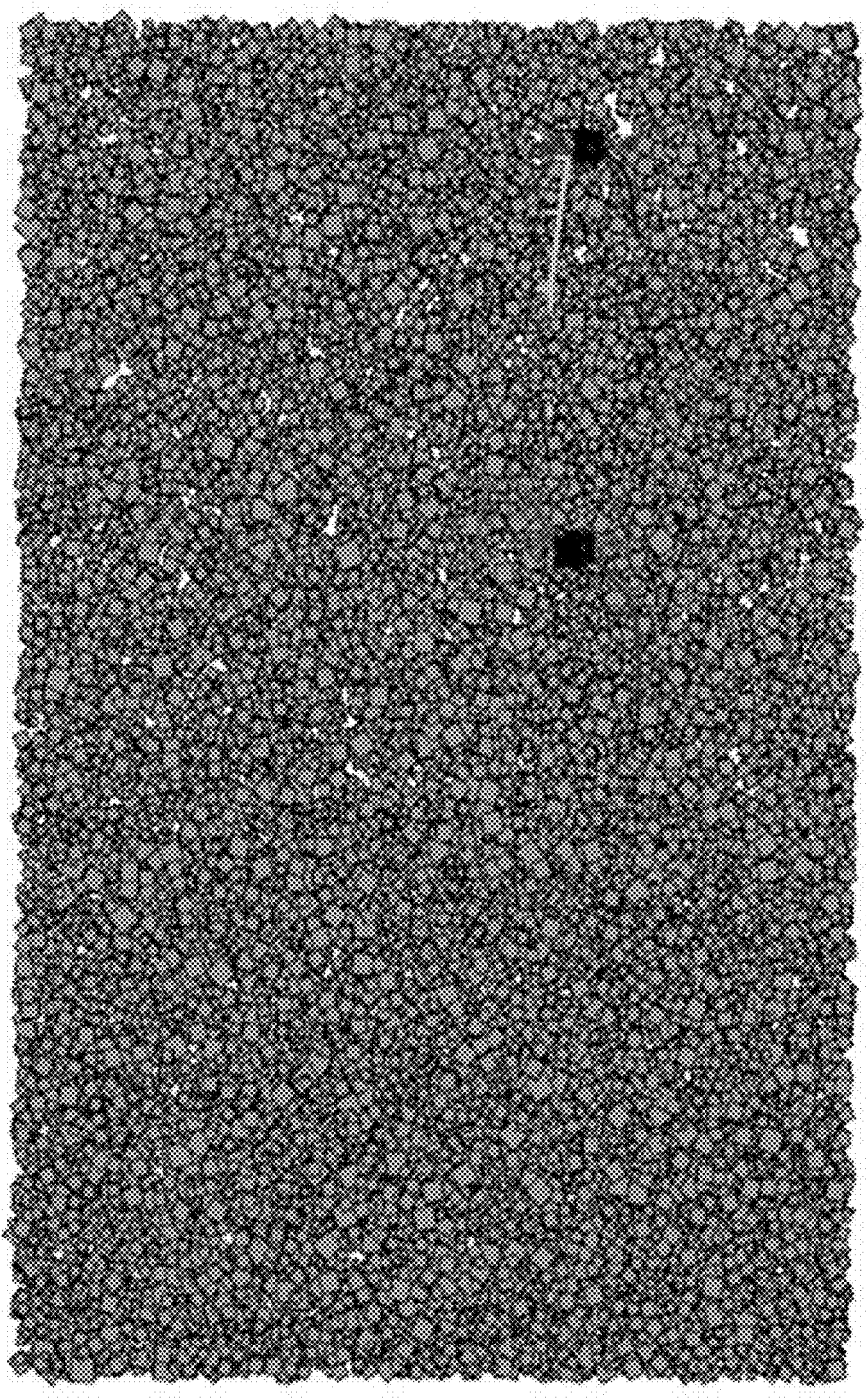
FIG. 2 is a diagram of a reservoir natural fracture network model obtained by integrated analysis of rock core-logging-seismic data.

S2, identifying microscopic natural fracture parameters by rock core analysis, obtaining three-dimensional configuration and distribution of fractures around a well through the analysis of imaging log data, obtaining the distribution of natural fractures in the reservoir through analysis of seismic interpretation results, and establishing a natural fracture network model finally through integration of rock core-logging-seismic data. The specific establishing process comprises five steps:

S2(I) researching the distribution of multi-scale natural fractures in a rock core by rock core observation, logging data, sheet observation and scanning electron microscopy testing and analysis, and making statistics on the morphology, size and density parameters of micro-fractures;

S2(II) analyzing imaging logging data to obtain the three-dimensional distribution, dip angle, trend, spatial density and size of fractures around a well;

S2(III) analyzing seismic interpretation results to obtain the three-dimensional distribution of natural fractures in the reservoir, generating a natural fracture network in a three-dimensional space in combination with rock core analysis results and analysis results of fractures around the well based on imaging logging data, and distinguishing and making statistics on the size and distribution conditions of different types of natural fractures, as shown in FIG. 2;

S2(IV) performing attribute assignment on fracture aperture and permeability parameters of three-dimensional fractures in combination with rock core-imaging logging analysis results in S2(I) and S2(II) and the size and distribution states of different types of natural fractures in S2(III) step; and S2(V) embedding the natural fracture network model into the grids of the three-dimensional geological model, calculating facture attributes of the natural fractures embedded in the grids in combination with rock core-imaging logging analysis results (including different types of fracture apertures, permeability), calculating the equivalent permeability and porosity of the fracture grids, and meanwhile, calculating a fracture shape factor by using a fracture spacing within a unit grid in combination with the fracture density degree on the unit grid.

Figure 3:
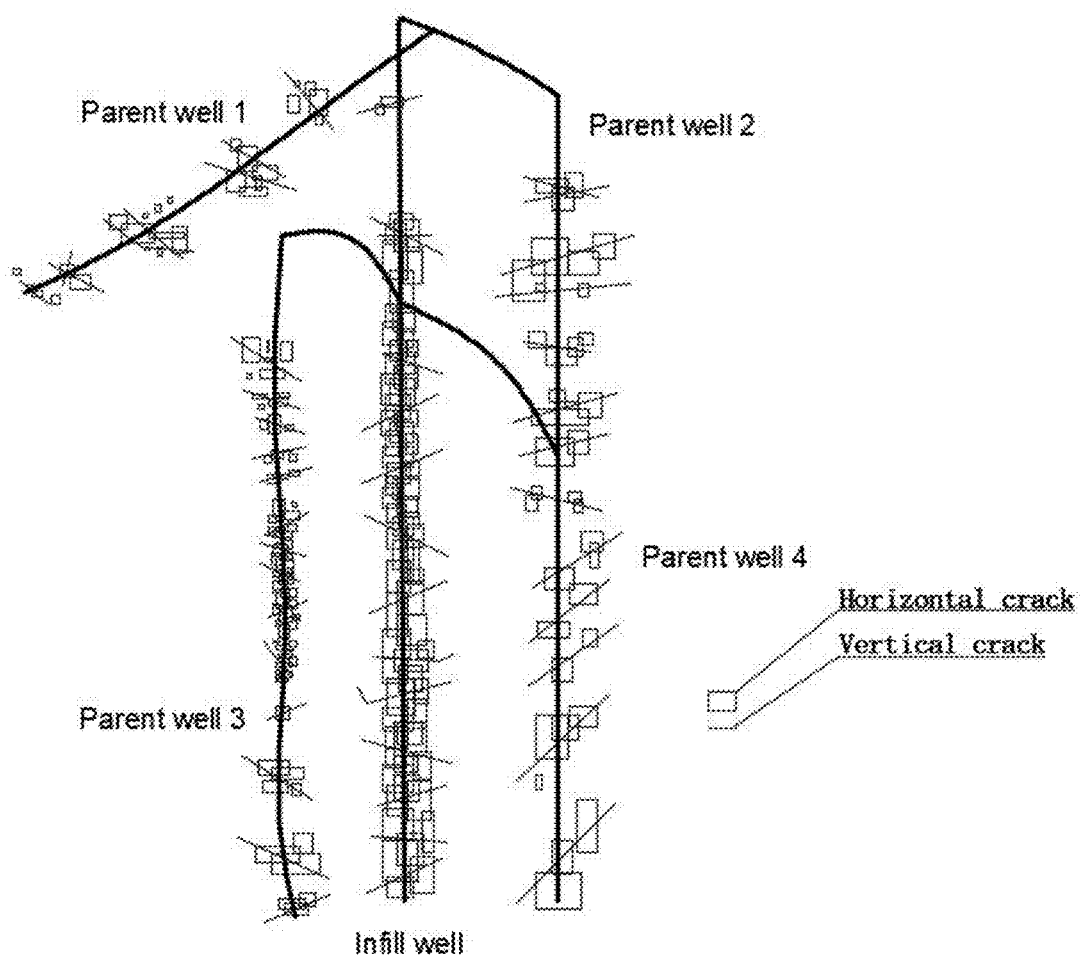
FIG. 3 is a comparison verification chart of a microseismic monitoring result of the parent wells construction and complex fractures in simulated volume fracturing.

S3, embedding the natural fracture network model into the three-dimensional geological model, and calculating based on hydraulic fracturing design and construction data to generate complex fractures in hydraulic fracturing of the parent wells. The specific calculation process includes the following four steps:

S3(I) analyzing and make statistics on the design and construction parameters of the pre-fracturing well in a study block, including a fracturing interval, a perforation interval, a perforation cluster length, a fracturing fluid volume, a pump pressure, and a displacement;

S3(II) setting fracturing segmentation data and perforation data in each parent well of the study block, and entering an actual pumping procedure and construction parameters;

S3(III) performing fitting calculation on the complex fractures in volume fracturing of the parent wells in a three-dimensional geological model with a natural fracture network to finally form a three-dimensional geological model with a complex fracture network, and analyzing the morphology of the complex fractures in volume fracturing and the impact of natural fractures on the formation of complex fractures; and S3(IV) performing comparison verification on the complex fractures in volume fracturing by using microseismic monitoring results, as shown in FIG. 3.

Figure 4:
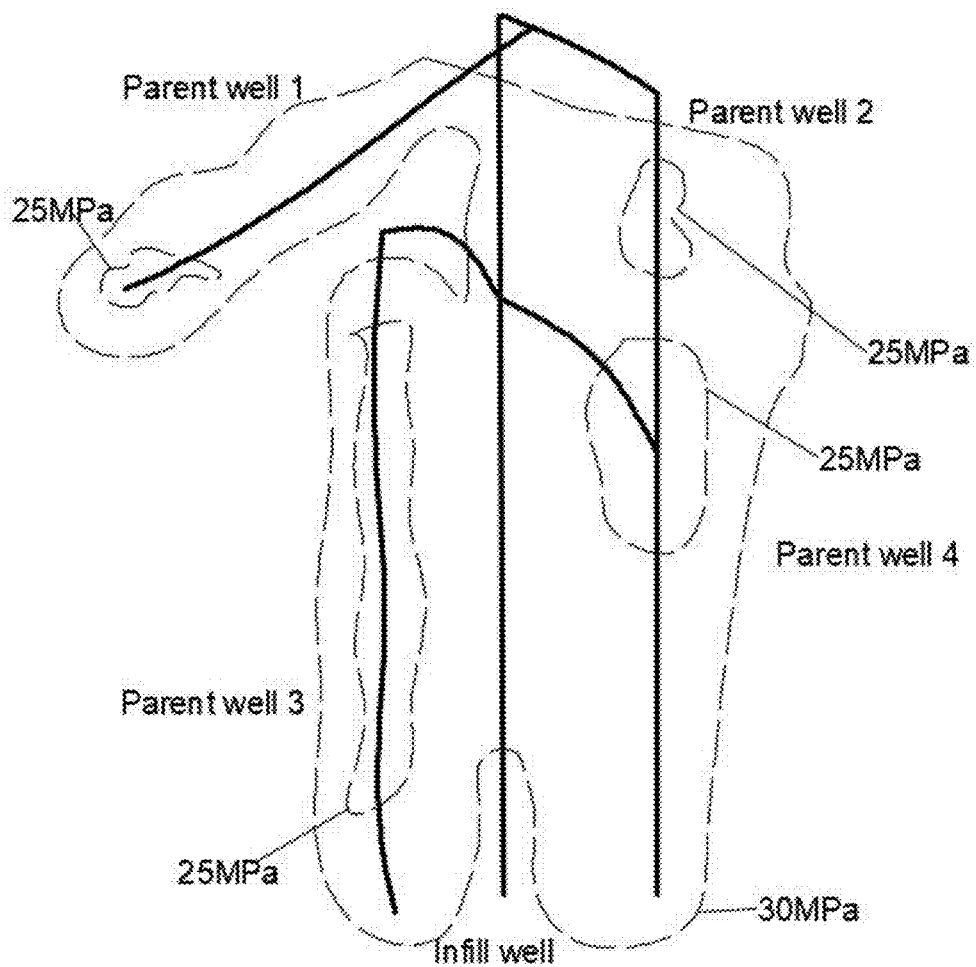
FIG. 4 shows a history fitting result of a pore pressure before infill well fracturing.

S4, embedding the complex fractures in hydraulic fracturing of the parent wells into a geological model with natural fractures, establishing a three-dimensional unconventional oil and gas reservoir model according to the three-dimensional geological model, and analyzing and calculating the changes in pore pressure field of the reservoir in different periods by using production dynamic parameters, wherein the specific calculation process comprises the following three steps:

S4(I), introducing a three-dimensional geological model with a complex fracture network (including natural fractures and hydraulically fractured fractures) into an oil reservoir simulator, establishing a three-dimensional shale gas reservoir model with finite difference grids, and considering the physical properties of a reservoir matrix, the complex fracture permeability anisotropy, the porosity, and the fracture shape factor properties in the model;

S4(II), establishing a two-hole seepage flow mechanism in a three-dimensional unconventional oil and gas reservoir model, setting a shale desorption model and a phase infiltration model according to the indoor rock core experiment results, and establishing a vertical pipe flow model based on the results of the well testing analysis;

S4(III), performing historic fitting in the three-dimensional unconventional oil and gas reservoir model in combination with production dynamic data within a certain time (the specified time can be determined according to actual needs of the on-site engineering, and can be different times within a production time period of several days or months or years) of single well in different positions, and calculating the three-dimensional pore pressure field in different production times (infill time) of the parent wells, as shown in FIG. 4.

Figure 5:
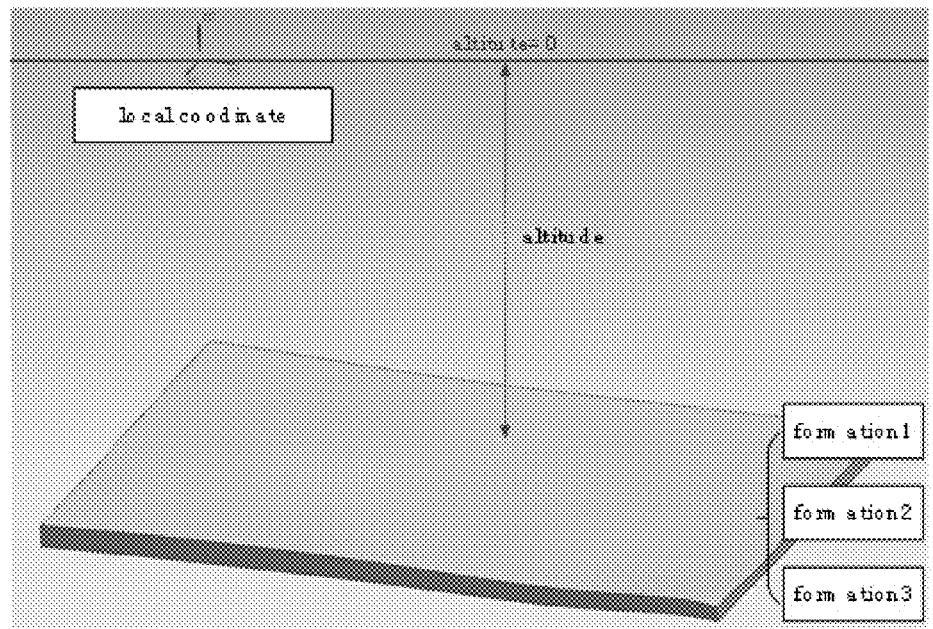
FIG. 5 is a diagram showing a geometric inversion result of the reservoir.
Figure 6:
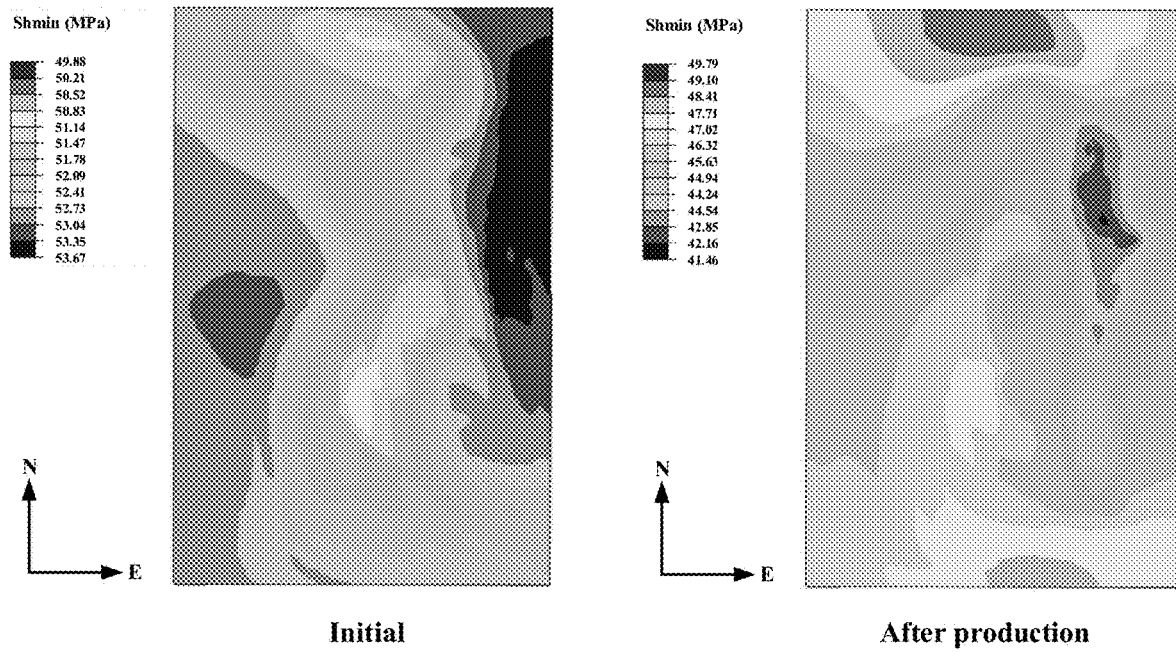
FIG. 6 is a comparison diagram of a minimum horizontal principal stress at the initial exploitation stage and a minimum horizontal principal stress after the exploitation.

S5, establishing a four-dimensional dynamic geostress model with reservoir physical properties and rock mechanical properties by using the three-dimensional geological model, and analyzing and calculating the dynamic evolution of dynamic geomechanical parameters (such as geostress) of the reservoir according to the change results of pore pressure field. The specific calculation process includes the following five steps:

S5(I), inverting the reservoir geometry information of the study block according to node parameters of the geological model, and establishing a geometric entity, as shown in FIG. 5;

S5(II), selecting an element type according to the stratification of the reservoir and dividing grids to establish a finite element geomechanical grid model;

S5(III), compiling a three-dimensional search interpolation program, and interpolating the attributes in the three-dimensional geological model into the finite element geomechanical grid model to establish a three-dimensional isotropic geomechanical model;

S5(IV), establishing a shale transverse isotropic geomechanical model in combination with anisotropy and stress sensitivity parameters; and S5(V), with the dynamic pore pressure field obtained from historical fitting as the boundary condition, calculating and analyzing the evolution of the dynamic geomechanical parameters of the reservoir (especially the magnitude and direction of the geostress), as shown in FIG. 6.

Figure 7:
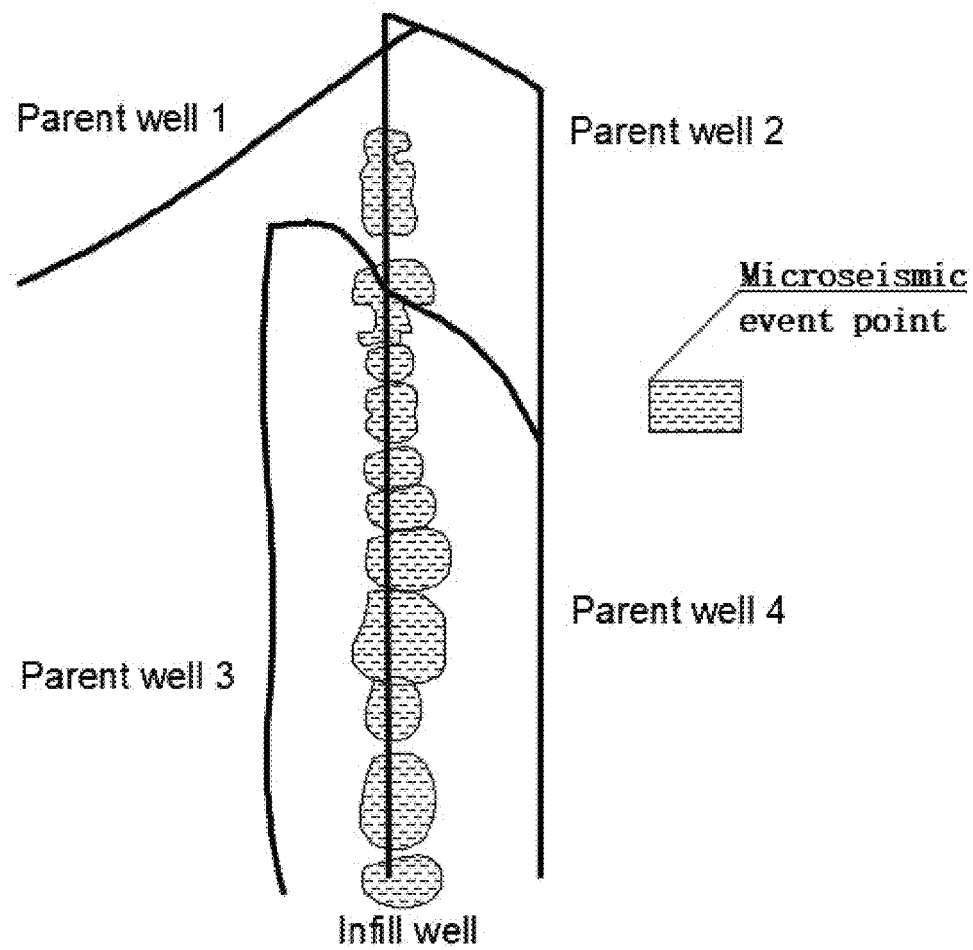
FIG. 7 is a comparison verification diagram of microseismic monitoring results of infill well construction and complex fractures in simulated volume fracturing.

S6, updating the relevant geomechanical parameters in the original geological model with a complex fracture network according to the evolutionary results of dynamic geomechanical parameters (such as geostress), and on this basis, calculating the complex fractures in volume fracturing of the infill well in combination with volume fracturing design/construction data of the infill well. The specific calculation process includes the following three steps:

S6(I), interpolating the evolution results of dynamic geomechanical parameters (such as geostress) calculated by the finite element model into the original geological model with a complex fracture network by using a three-dimensional search interpolation program and updating relevant geomechanical parameters;

S6(II), performing fitting calculation on the complex fractures generated during volume fracturing of the infill well in a three-dimensional geological model with a complex fracture network (natural fractures and fractures in parent well fracturing);

S6(III), performing comparative verification on the complex fractures in volume fracturing by using microseismic monitoring results as shown in FIG. 7, and analyzing the impacts of the parent well exploitation effect on the morphology of the fractures in infill well fracturing by comparing with a current three-dimensional geostress field.

Figure 8:
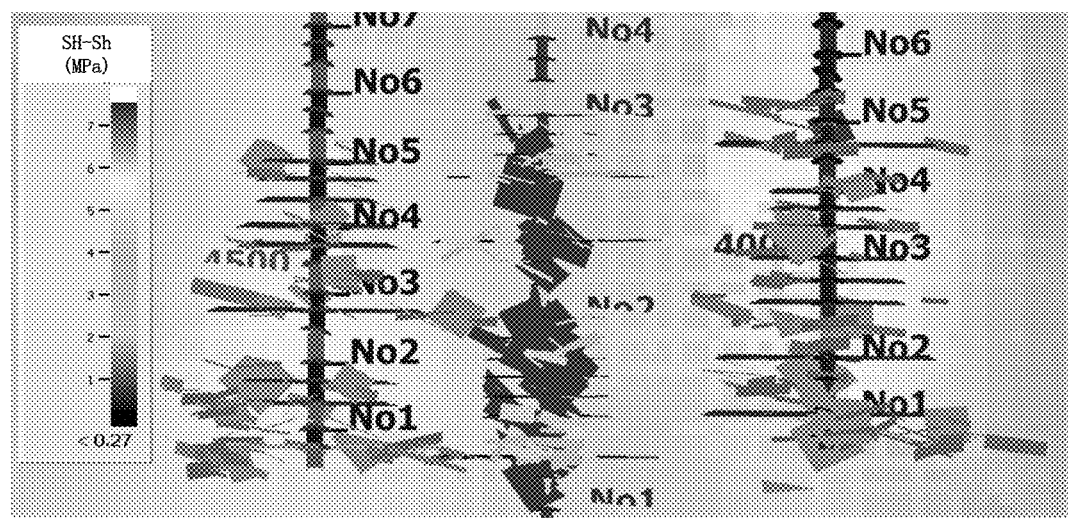
FIG. 8 is a comparison diagram of the horizontal stress difference in different production times (infill times) of the parent wells and the distribution of complex fractures in the infill well.
Figure 9:
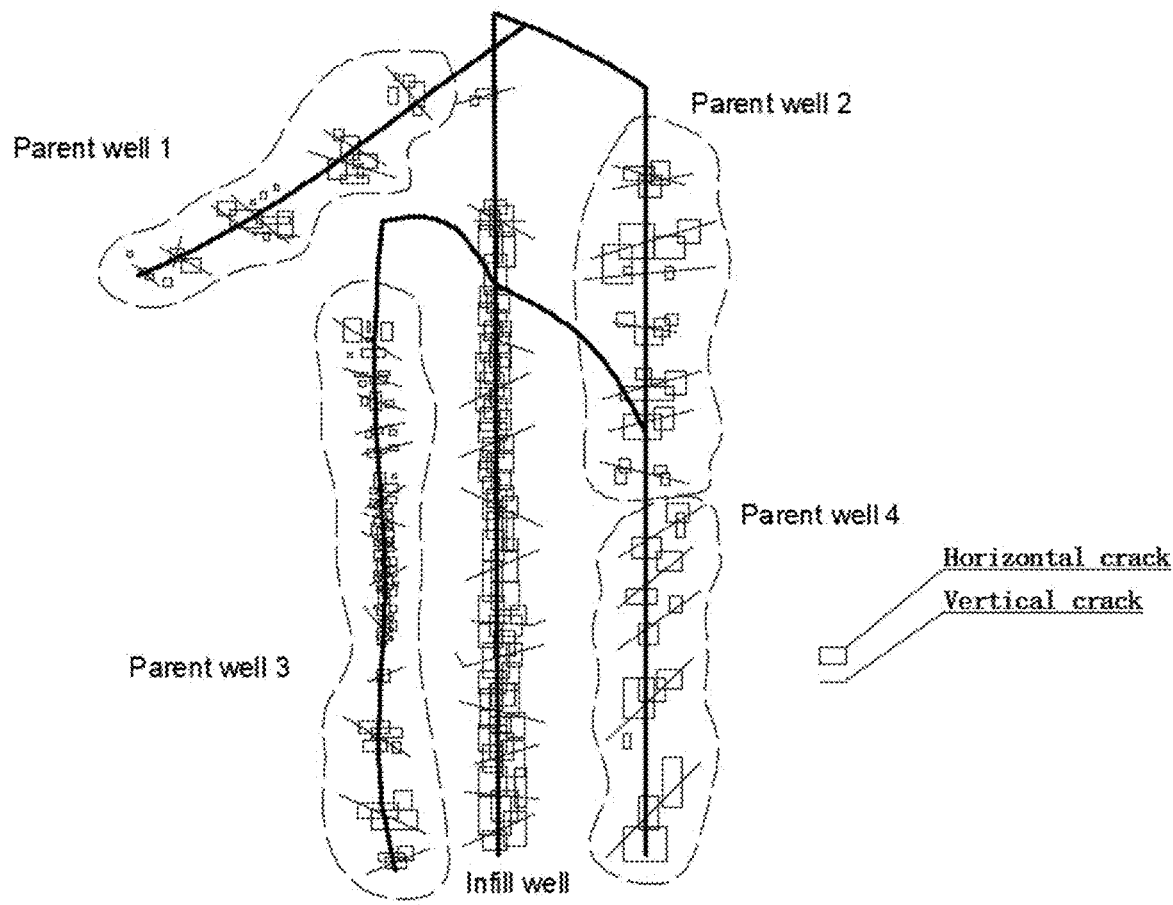
FIG. 9 is a diagram showing the finally determined microseismic event barrier region and its dynamic boundary.

S7, comparing a horizontal stress difference in different production times (infill times) of the parent wells with the complex fracture distribution of the infill well to determine the microseismic event barrier region and its dynamic change process. The specific analysis process includes the following four steps:

S7(I), obtaining a horizontal stress difference after a certain time of production (the time can be determined according to actual needs of the on-site engineering, and can be different times within a production time period of several days or months or years) according to the dynamic geostress calculation result;

S7(II), obtaining complex fracture distribution and geometric parameters of volume fracturing of the infill well after a certain time of production (the time can be determined according to actual needs of the on-site engineering, and can be different times within a production time period of several days or months or years);

S7(III), comparing the horizontal stress difference of the parent wells after a certain period of production (the time can be determined according to actual needs of the on-site engineering, and can be different times within a production time period of several days or months or years) with the complex fracture distribution of the infill well based on the fact that the larger the horizontal stress difference is, the more difficult it is to produce complex fractures as shown in FIG. 8, and if the fracture complexity of the infill well fracturing is obviously reduced from a certain position to an area in the parent wells and the horizontal stress difference is significantly increased, determining that the barrier effect of microseismic events occurs in this area, wherein the boundary of the barrier region is a position which is near the infill well and where the fracture complexity changes as shown in FIG. 9; and S7(IV), comparing the horizontal stress difference in different production times (infill time) of the parent wells with the complex fracture distribution of the infill well to determine the corresponding microseismic event barrier region, and finally forming a dynamic change process of the microseismic event barrier region.

Further, the step S7 comprises the following four steps:

S7(I), obtaining a horizontal stress difference after a certain time of production according to the dynamic geostress calculation result;

S7(II), obtaining complex fracture distribution and geometric parameters of volume fracturing of the infill well after parent well production;

S7(III), comparing the horizontal stress difference of the parent wells after a certain period of production with the complex fracture distribution of the infill well based on the fact that the larger the horizontal stress difference is, the more difficult it is to produce complex fractures, and determining an area where the barrier effect of microseismic events occurs, wherein the boundary of the barrier region is a position which is near the infill well and where the fracture complexity changes; and S7(IV), comparing the horizontal stress difference in different production times (infill times) of the parent wells with the complex fracture distribution of the infill well to determine the corresponding microseismic event barrier region, and finally forming a dynamic change process of the microseismic event barrier region.

Figure 10:
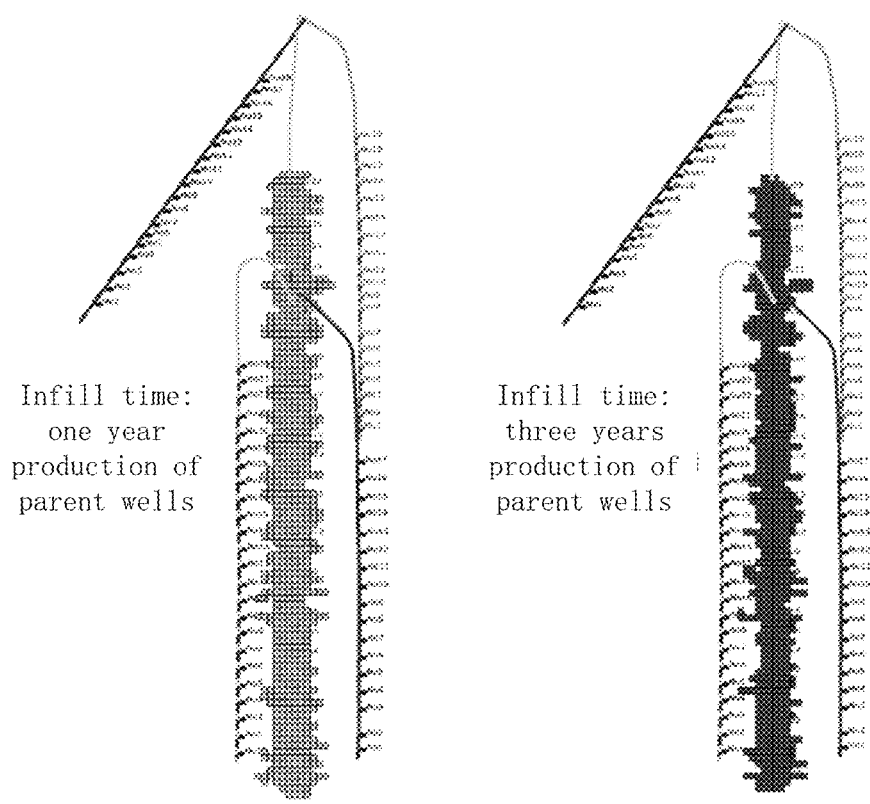
FIG. 10. is a comparison diagram of effectively reconstructed areas in infill well fracturing in different infill times.
Figure 11:
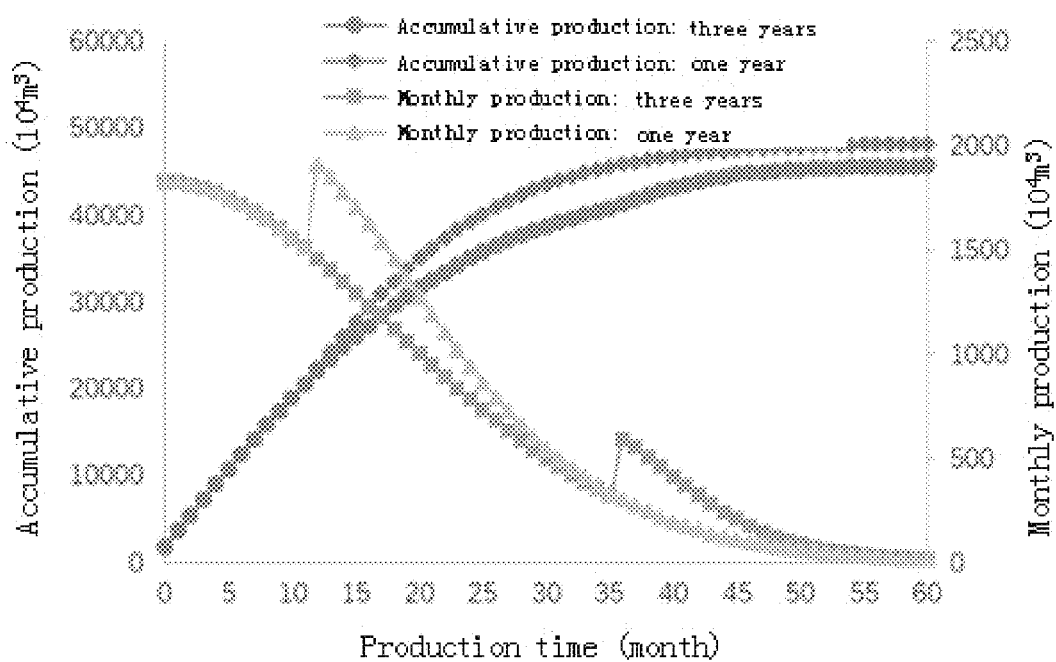
FIG. 11 is a comparison curve chart of block production in different infill times.

S8, determining effectively reconstructed fractures of the infill well with the microseismic event barrier region in S7 as a boundary, embedding the effectively reconstructed fractures into the oil and gas reservoir numerical simulation model established in S4, calculating the prediction results of single-well and regional productivity after infill well reconstruction in different times, comparing the long-term and short-term cumulative production and recovery rate conditions of the infill well, and preferably selecting an infill time window of the unconventional oil and gas reservoir. The specific analysis process comprises the following four steps:

S8(I), with the corresponding microseismic event barrier region in different production times (infill times) of the parent wells in step S7(IV) as a boundary, taking fractures outside (i.e., near the infill well) the microseismic event barrier region in the fracture simulation result of volume fracturing of the infill well in S6 as fractures in an effective reconstruction area (see FIG. 10);

S8(II), similar to S4(I), embedding the fracture simulation result in infill well fracturing in S6 into the oil and gas reservoir numerical simulation model established in S4 on the premise of retaining the fractures of the parent wells;

S8(III), with the production starting time of the infill well as an initial time, simulating the production process of the infill well by using the oil and gas reservoir numerical simulation model, calculating a relationship of changes in the production time and yield of the infill well, and evaluating the productivity and recovery rate of the infill well; and S8(IV), for the single-well and regional productivity and recovery rates of the infill well in different infill times (see FIG. 10), finally determining a favorable infill time window by taking the simultaneous maximization of the maximum productivity and recovery rate as a standard, and revealing the impacts of fractures in infill well fracturing in different infill times on the productivity of the infill well through the microseismic event barrier region.

Therefore, the method for determining the microseismic event barrier region can be used to describe the distribution and parameters of natural fractures in the shale reservoir, and based on this, fit the parameters of fractures in volume fracturing of the parent wells, and further simulate the changes in geostress and geomechanical parameters at the different positions within different production times (infill times) of different parent wells. Based on this, by performing fitting calculation on the complex fractures in volume fracturing of the infill well, the true dynamic change state of the shale reservoir during the early stage of fracturing, production, and infill well fracturing and the morphology of complex fractures in volume fracturing of the infill well can be reflected to a larger extent. Therefore, the barrier effect of microseismic events during fracturing of the infill test well is revealed accurately, and meanwhile, a series of technical difficulties that traditional geomechanical models have low accuracy in describing natural fracture networks, fractures in parent well fracturing cannot be accurately reflected in shale reservoir seepage, the three-dimensional static geostress model cannot accurately reflect the changes in geostress and reservoir parameters during the development of unconventional oil and gas reservoirs, the infill well fracturing analysis cannot be based on the true geomechanical state, and incorrect evaluation on the productivity of the infill well is caused by inaccurate consideration of fractures in infill well fracturing in the infilled numerical model are solved.

The above is only the model establishing embodiment of the present invention. It should be understood that the present invention is not limited to the forms disclosed herein, and should not be construed as being excluded from other embodiments, but may be used in various other combinations, modifications, and environments, and can be modified by the above teachings or related art or knowledge within the scope of the concepts described herein. However, all changes and modifications made by those skilled in the art should be made without departing from the spirit and scope of the present invention.

The invention claimed is:

1. A method for determining a favorable time window of an infill well of an unconventional oil and gas reservoir, comprising the following steps:

S1, establishing a three-dimensional geological model with a plurality of physical parameters and a plurality of geomechanical parameters, wherein horizon information in the three-dimensional geological model matches a real formation horizon, the plurality of physical parameters comprise at least a porosity, a permeability, a saturation and a plurality of sedimentary facies, and the plurality of geomechanical parameters comprise at least a Young's modulus, a Poisson's ratio, a lithology, a lithofacies and a three-way geostress;

S2, identifying a plurality of microscopic natural fracture parameters by a rock core analysis, obtaining a three-dimensional configuration and a distribution of a plurality of fractures around a well through an analysis of imaging log data, obtaining a distribution of a plurality of natural fractures in a reservoir through an analysis of a plurality of seismic interpretation results, and establishing a natural fracture network model finally through an integration of rock core-logging-seismic data;

S3, embedding the natural fracture network model into the three-dimensional geological model, and calculating a plurality of complex fractures in a hydraulic fracturing of a plurality of parent wells based on a hydraulic fracturing design and construction data;

S4, embedding the plurality of complex fractures in the hydraulic fracturing of the plurality of parent wells into the three-dimensional geological model with the plurality of natural fractures, establishing a three-dimensional unconventional oil and gas reservoir model according to the three-dimensional geological model, and analyzing and calculating a plurality of changes in a pore pressure field of the reservoir in a plurality of periods by using a plurality of production dynamic parameters;

S5, establishing a four-dimensional dynamic geostress model with a plurality of reservoir physical properties and a plurality of rock mechanical properties by using the three-dimensional geological model, and analyzing and calculating a dynamic geostress evolution of the reservoir according to the plurality of changes of the pore pressure field;

S6, combining a plurality of geostress results in a plurality of exploitation times of the plurality of parent wells with a complex fracture network geological model, and calculating the plurality of complex fractures in a volume fracturing of the infill well in the plurality of exploitation times of the plurality of parent wells on a basis of the complex fracture network geological model with a plurality of updated geomechanical parameters and in combination with a volume fracturing design and construction data of the infill well;

S7, comparing a horizontal stress difference in a plurality of production times of the plurality of parent wells with a complex fracture distribution of the infill well to determine a microseismic event barrier region and a dynamic change process of the microseismic event barrier region; and S8, determining a plurality of effectively reconstructed fractures of the infill well with the microseismic event barrier region in S7 as a boundary, embedding the plurality of effectively reconstructed fractures into the three-dimensional unconventional oil and gas reservoir model established in S4, calculating a plurality of prediction results of a single-well and a regional productivity after the infill well reconstruction in a plurality of times, comparing a plurality of long-term and short-term cumulative production and recovery conditions of the infill well, and selecting an infill time window of the unconventional oil and gas reservoir.

2. The method for determining the favorable time window of the infill well of the unconventional oil and gas reservoir according to claim 1, wherein the step S7 comprises the following four steps:

S7(I), obtaining a horizontal stress difference after a predetermined time of production of the plurality of parent wells according to a dynamic geostress calculation result;

S7(II), obtaining the complex fracture distribution and a plurality of geometric parameters of volume fracturing of the infill well after the predetermined time of production of the plurality of parent wells;

S7(III), comparing the horizontal stress difference of the plurality of parent wells after the predetermined period of production with the complex fracture distribution of the infill well based on a fact, wherein the fact is the larger the horizontal stress difference is, the more difficult the plurality of complex fractures are produced and determining an area, wherein a barrier effect of a plurality of microseismic events occur in the area, a boundary of the area is near the infill well and a fracture complexity changes in the area; and S7(IV), comparing the horizontal stress difference in the plurality of production times of the plurality of parent wells with the complex fracture distribution of the infill well to determine a corresponding microseismic event barrier region, and finally forming a dynamic change process of the corresponding microseismic event barrier region.

3. The method for determining the favorable time window of the infill well of the unconventional oil and gas reservoir according to claim 1, wherein a specific analysis process of step S8 comprises the following four steps:

S8(I), with the corresponding microseismic event barrier region in the plurality of production times (infill times) of the plurality of parent wells in step S7(IV) as a boundary, taking a plurality of fractures outside the microseismic event barrier region in a fracture simulation result in a hydraulic fracturing of the infill well as the plurality of fractures in an effectively reconstructed area;

S8(II), embedding the fracture simulation result in an infill well fracturing in S8 into the three-dimensional unconventional oil and gas reservoir model established in S4 on a premise of retaining parent wells fracturing;

S8(III), with a production starting time of the infill well as an initial time, simulating a production process of the infill well by using the three-dimensional unconventional oil and gas reservoir model established in S4, and calculating a relationship of a plurality of changes in a production time and yield of the infill well, and evaluating a productivity and a recovery rate of the infill well; and S8(IV), for the single-well, the regional productivity and recovery rates of the infill well in the plurality of infill times, finally determining a favorable infill time window by taking a simultaneous maximization of the regional productivity and the recovery rates as a standard, and revealing an impact of the plurality of fractures in the infill well fracturing in the plurality of infill times on the regional productivity of the infill well through the microseismic event barrier region.

* * * * *